Patented Dec. 4, 1928.

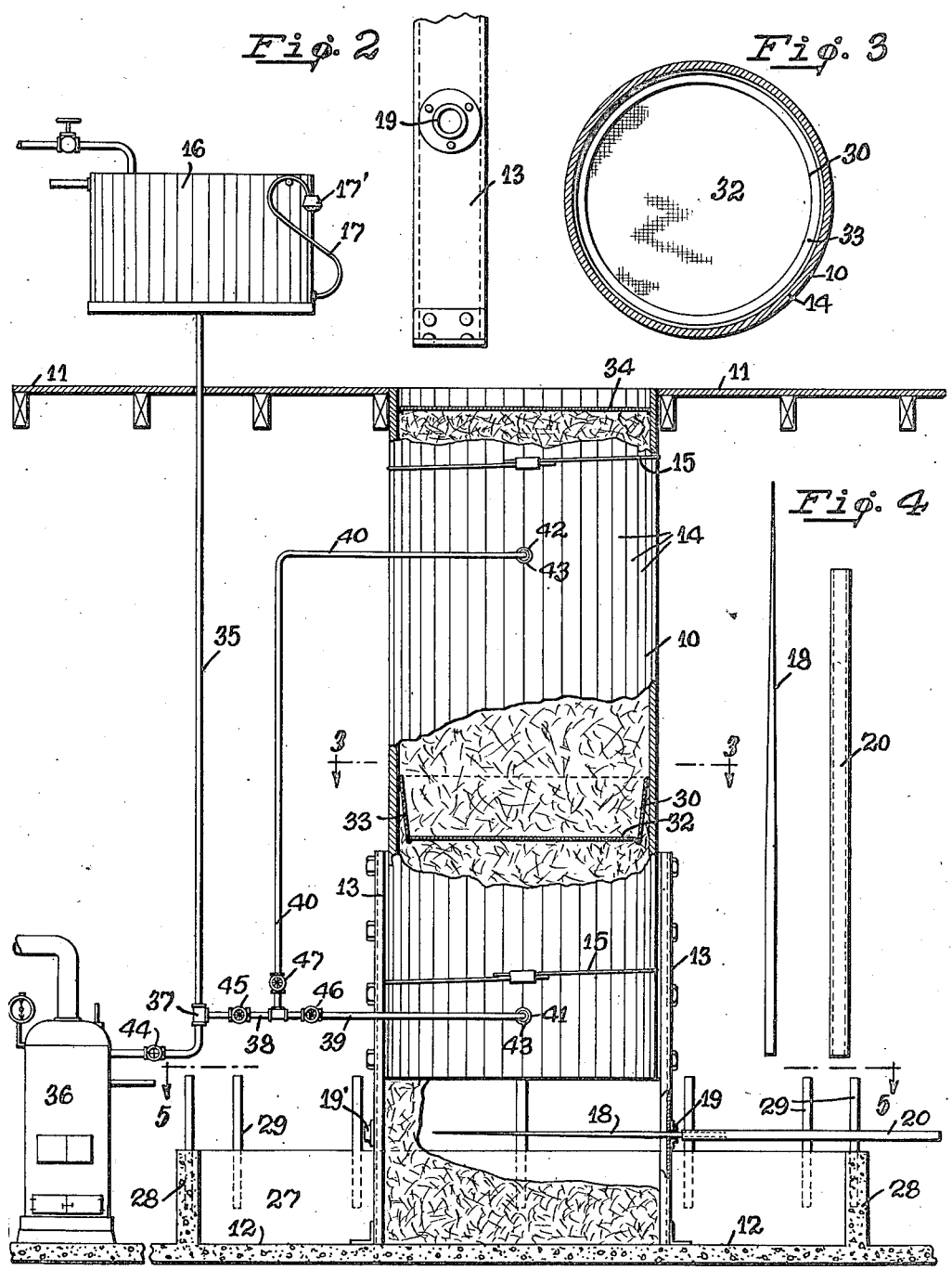

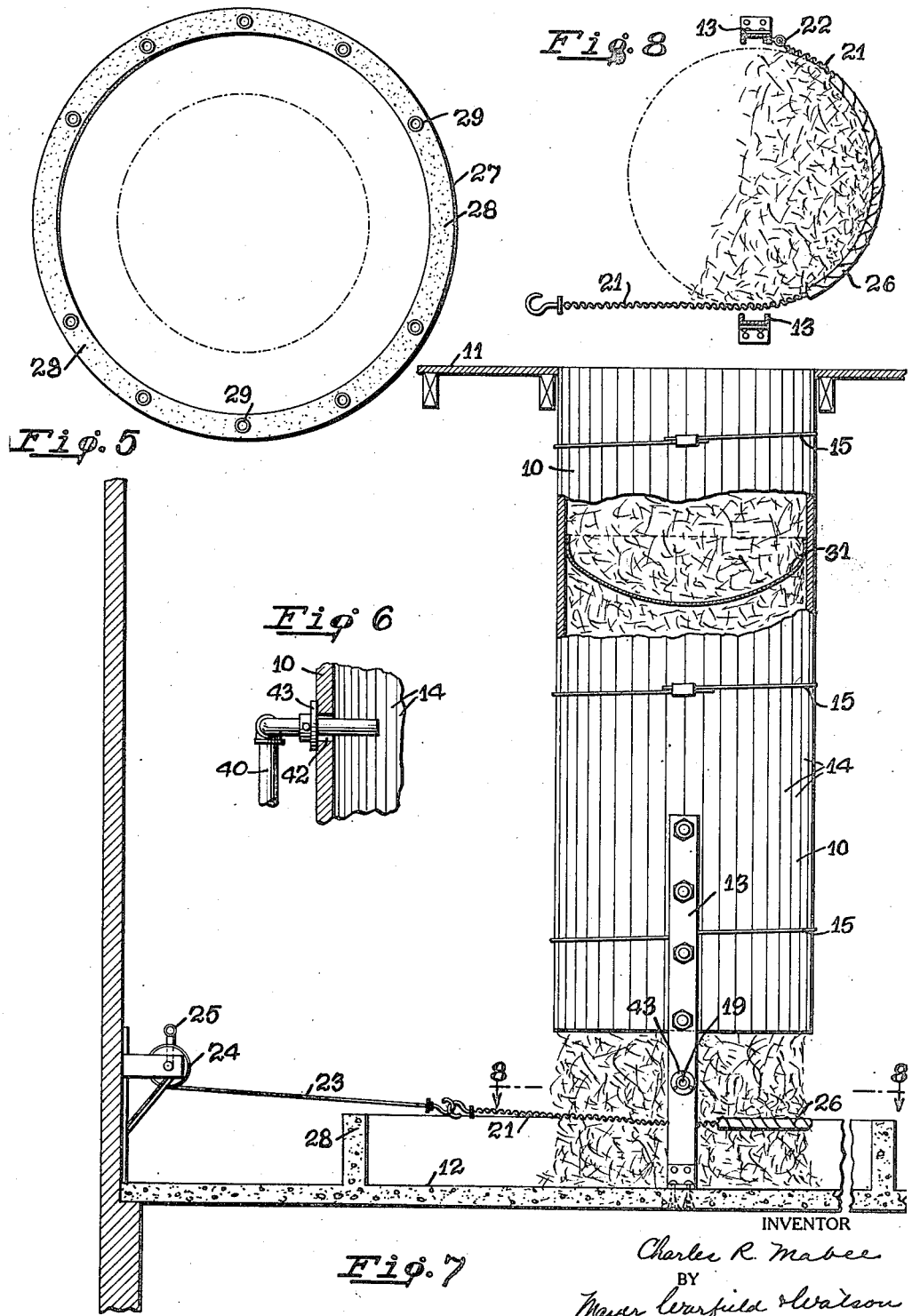

1,693,611

UNITED STATES PATENT OFFICE.

CHARLES R. MABEE, OF BUFFALO, NEW YORK, ASSIGNOR TO MABEE PATENTS CORPORATION, OF DOVER, DELAWARE, A CORPORATION OF DELAWARE.

MANUFACTURE OF LIVESTOCK FEEDS.

Application filed September 23, 1925. Serial No. 58,125.

This invention relates to the manufacture of livestock feeds, and more particularly to a method and apparatus for the treatment of materials in the nature of farm roughage in the preparation of such feeds.

An object of the invention is to provide a simple and efficient method of preparing farm roughage for use as a feeding material.

Another object is to provide an improved method for the production of an appetizing, nourishing and easily digested feed by the fermentation of farm roughage.

Still another object is to provide an improved form of apparatus whereby farm roughage may be readily and economically converted into a desirable feeding material A more specific object is the provision of means in connection with such apparatus whereby the treated roughage may be readily removed for feeding.

Other objects of the invention will in part be obvious and will in part appear hereinafter.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which:

Fig. 1 is a side elevation of one type of conversion apparatus exemplifying the invention with portions of the apparatus broken away;

Fig. 2 is a view taken at right angles to Fig. 1 and showing a portion of the apparatus on an enlarged scale;

Fig. 3 is a section of a portion of the apparatus taken along the line 3—3 in the direction of the arrows in Fig. 1;

Fig. 4 is a detail view illustrating on a large scale certain of the members of the apparatus;

Fig. 5 is a sectional view taken along the line 5—5 in the direction of the arrows of Fig. 1, certain parts of the apparatus being omitted;

Fig. 6 is a detail, partly sectional, view illustrating other portions of the apparatus;

Fig. 7 is an elevation taken at right angles to Fig. 1 and with portions of the apparatus broken away to reveal an alternate form of one portion of the apparatus;

Fig. 8 is a sectional view taken along the line 8—8 of Fig. 7.

The invention contemplates subjecting farm roughage such as hay, straw, fodder, clover, vines, and the like to a conversion treatment whereby there may be produced a comparatively appetizing, nourishing and easily digested live stock feed, and embraces a method and apparatus whereby dry farm roughage may be treated to produce such a feed at or near the point of consumption. To this end there is provided a conversion receptacle or container 10 which, in the present instance, is open at both its ends and extends downwardly from a mow floor 11 to a plane positioned a substantial distance above a lower floor 12, the container being supported upon the latter floor by means of a plurality of standards 13. It will be understood, of course, that the container may extend downwardly to the feeding floor, in which case an opening for the removal of the treated roughage may be provided in the wall of the container. The wall of the container 10, as exemplified, is composed of a plurality of staves 14 bound together by hoops or bands 15. In practice it is desirable to maintain a supply of dry roughage upon the mow floor 11, and to introduce batches of this roughage into the conversion receptacle for treatment from time to time in accordance with the needs of the animals to be fed. The conversion treatment is ordinarily facilitated if the roughage is in a comminuted state, and the roughage may be comminuted either before it is placed on the mow floor or at any time prior to its introduction into the receptacle. The conversion of the roughage may be accomplished by a fermentative action of the ferments inherent in the roughage either alone or in conjunction with ferments added thereto. In order to permit the desired fermentation to take place, each batch of roughage may be moistened to a desired degree either before, during, or after its introduction into the conversion receptacle, and to this end the exemplified apparatus includes a liquid container such as the tank 16, which is spaced above the mow floor 11 and provided with an outlet pipe 17 equipped with a nozzle 17' whereby the contents thereof may be sprayed upon the roughage. The liquid container may be filled with water or other suitable liquid, or with a fluid mixture containing a suitable converter material, such, for example, as yeast, diastatic malt or other material which may be advantageous in the treatment.

In the preferred form of operation, liquid from the tank 16 is sprayed upon a mass of dry comminuted roughage as the mass is introduced into the container 10, and the roughage is then packed in any suitable manner, as by tramping, after which additional liquid is sprayed upon the packed material. The packing not only facilitates the absorption of moisture by the particles of roughage, but prevents the added liquid from running through the mass, and assures a thorough permeation thereof. The material may be packed, if desired, either during or after the spraying of the material in the container.

Preferably there is introduced only a sufficient quantity of liquid to moisten the mass thoroughly without submerging the same. For example about 150 lbs. of liquid may be employed in the preliminary moistening of 200 pounds of dry roughage, and a second 150 lbs. of liquid sprayed upon the roughage after it is packed. The liquid sprayed upon the roughage may be either hot or cold, as desired. In any case, a certain amount of heat will be generated by the conversion action itself, for example, if water at room temperature is introduced into the roughage, the temperature of the roughage under treatment will ordinarily reach the desirable temperature of about 135° F., after 48 hours, whereas, if the temperature of the water is approximately 100° F., when introduced, the temperature of the roughage under treatment will in many cases reach 135° at the end of a 24 hour period. It will of course be appreciated that the preferred conversion temperatures and the time of treatment will vary in accordance with the nature of the materials employed.

The packed material is held in the container a sufficient length of time to allow the ferments to work and to permit the farm roughage to be converted to the desired extent, after which it may be withdrawn from the base of the container. Both because of the packing and of the natural cohesiveness of the moistened roughage and because of the weight of the mass of roughage in the container, considerable difficulty is often experienced in removing the roughage from its position in or adjacent the base of the container. Accordingly, in order to facilitate the removal of the treated roughage from this position there is provided means for loosening the packed roughage prior to its removal. In the present instance this means consists of a lever member including a bar or prong 18 (Figs. 1 and 4) arranged to be extended through an orifice in either of the uprights, such as indicated at 19 and 19' in Fig. 1 and at 19 in Fig. 2, and to be rocked therein the sides of the orifice serving as a fulcrum for the lever. If desired, the prong 18 may be provided with a handle, such as the pipe indicated at 20, which, in the present instance, is fitted over the outer end thereof. The exemplified apparatus also includes means whereby the lateral displacement of the loosened roughage beneath the container may be accomplished, so as to permit the roughage in the container to slide downwardly therethrough, which means consist in the present instance of a cable in the form of a chain 21 attached at one end to one of the standards 13, as indicated at 22, and having its other end attached to a cable 23 which is arranged to be wound upon a cylinder 24 as the same is rotated by a handle 25. If desired, suitable gearing may be provided to increase the force exerted upon the side of the treated roughage by a given movement of a handle such as 25. A suitable gear reduction for this purpose is a reduction of 7 or 8 to 1. If desired, of course, the cable instead of being attached to a stationary member as at 22, may be looped about the material to be displaced and may be connected to a member such as the cable 23 at both its ends. In order to increase the pressure surface of the chain 21, there may be wrapped about a portion of the same a strip 26, of leather or other suitable material. For the purpose of avoiding the necessity of a further transportation of the roughage after it has been laterally displaced, as by the chain 21, a feeding trough or manger 27 may be provided adjacent the base of the container. In the present instance such a trough is formed by a circular wall 28, which extends upwardly from the feeding floor at a short distance from the container floor and which is equipped with a plurality of uprights 29 (Fig. 1) whereby separate portions of the trough 28 may be set off for individual animals. As will be seen from Fig. 5, these uprights are preferably so placed as not to interfere with the movements of the lever 18.

As portions of one batch of treated roughage are withdrawn from the base of the receptacle 10, it is often desirable to introduce a second batch of roughage into the top of the receptacle so that the latter batch may be fully converted by the time the original batch of roughage is entirely consumed by the animals. It is preferable, however, not to have batches of roughage at two stages of treatment or batches of roughage containing different materials in contact with each other, and to this end there is provided one or more partition members, such for example as shown at 30 in Figs. 1 and 3 or at 31 in Fig. 7, which may rest upon the top of one batch of roughage and may have a second batch of roughage placed and packed thereupon and which will be movable through the container as the treated material is withdrawn from the bottom thereof so as to permit all the material in the container to settle downwardly gradually. The partition members are preferably cup shaped so that they will collect any excess liquid in the upper batch of roughage and prevent it from seeping downwardly into the lower batch. The partition members are preferably made of flexible material such as tarpaulin so that they may adjust themselves to some extent to variations in the roughage and so that they may be readily withdrawn from the base of the container.

The shape of the separating partitions may vary widely and will be largely governed, of course, by the requirements of each individual case. In the exemplified apparatus the partition member 30 is formed with a flat bottom 32 and with substantially upright sidewalls 33, whereas the partition member 31 is generally rounded in shape. The construction of the partition member 30 is to be preferred inasmuch as it possesses a somewhat greater rigidity, and offers some resistance to any force tending to move it from its upright position as the material slides downwardly through the container. In order to prevent access of air to the material treatment, there may be provided a cover member 34, which may also be made of tarpaulin. The cover member 34 may be employed in conjunction with a partition member such as 30 to form a substantially enclosed conversion chamber for the roughage and to prevent drafts therethrough.

In certain cases it is desirable to heat the roughage to a certain extent so as to encourage the action of the ferments, and it may also be desirable under certain conditions to introduce additional moisture into the roughage after the treatment has progressed to a desired point. With these ends in view, there is provided in the present instance a pipe 35, extending from the tank 16 to the liquid chamber of a water heater or boiler 36, and formed at 37 with a T from which extends the pipe 38. Branch pipes 39 and 40 extend from the pipe 38 into the interior of the receptacle 10 through openings found at 41 and 42 respectively, in the wall thereof. These openings are preferably of somewhat larger diameter than the pipes 39 and 40 so as to permit these pipes to be readily inserted and withdrawn, suitable washers such as indicated at 43 being provided to close these openings (see Figs. 1 and 6). It will be observed from Fig. 1 that in the exemplified apparatus the openings at 41 and 42 may be so disposed that fluid passing through the pipes 39 and 40 will flow simultaneously into upper and lower batches of material separated by a partition such as 30. Suitable valve members such as shown at 44, 45, 46 and 47 may be provided to close the pipes 35, 38, 39 and 40, respectively. Thus it will be seen that when all the valves are open and the heater 36 is in operation the liquid therein may be heated or vaporized and the hot liquid or steam forced into the interior of the mass of material under treatment, or when the valve 44 is closed, liquid from the tank 16 may be conducted to the material under treatment through the pipe connections. The pipe 35, moreover, serves to permit steam or other fluid heated by the heater 36 to be introduced into the tank 16. By means of the introduction of steam into the roughage, while under treatment in the container the temperature and moisture content of the roughage can be readily controlled and the conversion processes encouraged in a simple and expeditious manner.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. The method of producing a live stock feed which includes introducing farm roughage into a vertical container arranged to permit the withdrawal of treated roughage from the base thereof, packing the roughage and subjecting the same to a conversion treatment, and subsequently causing the lower portion of said mass to be laterally moved bodily to a point at one side of the container to permit the remainder of the mass to move downwardly through said container.

2. In apparatus for the preparation of live stock feed, the combination with a vertical container for the treatment of a mass of farm roughage, of means to laterally displace the lower portion of a column of roughage, said means including a member arranged to be extended about one side of a mass of roughage adjacent the base of said container.

3. In apparatus for the preparation of live stock feed, the combination with a vertical container for farm roughage arranged to permit the removal of treated roughage at the base thereof, of means to effectuate such removal, said means including means to loosen the mass of treated roughage adjacent the base of the container, a cable arranged to be extended about one side of the loosened lower portion of the roughage, and means associated with said cable for causing a lateral displacement of at least a portion of said roughage.

4. In apparatus for the preparation of live stock feed, the combination with a vertical container arranged for the treatment of a mass of farm roughage, of means to pry apart portions of a mass of treated roughage adjacent the base of the container whereby the lower portion of the column of roughage is loosened to permit the ready removal thereof.

5. Apparatus for the treatment of farm roughage including a vertical container having an open lower end, a plurality of standards to support said container, a lever arranged to extend into a packed mass of roughage beneath the container, and means on one of said standards to hold said lever and to provide a fulcrum therefor.

6. In apparatus for the preparation of live stock feeds, the combination with a vertical container for farm roughage arranged to permit the removal of treated roughage at the base thereof, of means to effectuate such removal, said means including a cable arranged to be extended about one side of the lower portion of a mass of treated roughage and means associated with said cable for causing a lateral displacement of at least a portion of said roughage.

7. Apparatus for the treatment of farm roughage, including a vertical container having an open bottom, a plurality of standards to support said container and a bar arranged to extend through an orifice in one of said standards and into a packed mass of treated roughage beneath said container and to be operated therein as a lever to loosen the same, and a handle for said bar consisting of a hollow pipe fitted over the outer end of the same.

In testimony whereof I affix my signature.

CHARLES R. MABEE.